(12) United States Patent
Doane, Jr. et al.

(10) Patent No.: US 9,273,196 B2
(45) Date of Patent: Mar. 1, 2016

(54) MODELING COMPOUNDS AND METHODS OF MAKING AND USING THE SAME

(71) Applicant: Hasbro, Inc., Pawtucket, RI (US)

(72) Inventors: Linwood E. Doane, Jr., Chepachet, RI (US); Lev Tsimberg, Hazleton, PA (US); Tania Hall, Bethlehem, PA (US)

(73) Assignee: Hasbro, Inc., Pawtucket, RI (US)

( * ) Notice: Subject to any disclaimer, the term of this patent is extended or adjusted under 35 U.S.C. 154(b) by 0 days.

(21) Appl. No.: 13/986,212

(22) Filed: Apr. 12, 2013

(65) Prior Publication Data

US 2013/0274377 A1 Oct. 17, 2013

Related U.S. Application Data

(63) Continuation-in-part of application No. 13/446,413, filed on Apr. 13, 2012.

(51) Int. Cl.
*C08L 3/02* (2006.01)

(52) U.S. Cl.
CPC .................................... *C08L 3/02* (2013.01)

(58) Field of Classification Search
None
See application file for complete search history.

(56) References Cited

U.S. PATENT DOCUMENTS

| | | | |
|---|---|---|---|
| 3,167,440 A | 1/1965 | McVicker et al. | |
| 3,427,176 A | 2/1969 | Moriya | |
| 4,038,482 A * | 7/1977 | Eastman | 536/110 |
| 5,157,063 A | 10/1992 | Wetherell | |
| 5,171,766 A | 12/1992 | Mariano et al. | |
| 5,209,663 A | 5/1993 | Wilcox et al. | |
| 5,312,481 A | 5/1994 | Greiner | |
| 5,344,322 A | 9/1994 | Wilcox et al. | |
| 5,364,892 A | 11/1994 | Miller et al. | |
| 5,498,645 A * | 3/1996 | Mariano et al. | 523/218 |
| 5,506,280 A | 4/1996 | Miller et al. | |
| 5,562,451 A | 10/1996 | Wilcox et al. | |
| 5,861,214 A | 1/1999 | Kitano et al. | |
| 5,972,092 A * | 10/1999 | Cordova | 106/126.3 |
| 6,235,800 B1 | 5/2001 | Kyuno et al. | |
| 6,359,057 B1 * | 3/2002 | Li | 524/557 |
| 6,713,624 B1 * | 3/2004 | Doane et al. | 536/45 |
| 6,767,938 B1 * | 7/2004 | Cordova | 524/28 |
| 6,837,924 B2 | 1/2005 | Breindl et al. | |
| 6,949,137 B1 | 9/2005 | Erling | |
| 2006/0134311 A1 | 6/2006 | Mueller et al. | |
| 2011/0146534 A1 | 6/2011 | Uang | |

FOREIGN PATENT DOCUMENTS

| | | |
|---|---|---|
| WO | 0151557 | 7/2001 |
| WO | 0159004 | 8/2001 |

OTHER PUBLICATIONS

PCT International Search Report issued in PCT International Application No. PCT/US2013/036316 mailed on Aug. 6, 2013.
Extended European Search Report in EP 13775867.8 dated Oct. 23, 2015.

* cited by examiner

*Primary Examiner* — Melissa Swain
(74) *Attorney, Agent, or Firm* — Greenberg Traurig, LLP; David J. Dykeman; Natalie Salem

(57) ABSTRACT

Modeling compounds and methods for making the same are described. The modeling compounds, in some embodiments, comprise about 20% to about 40% by weight starch-based binder, and about 0.15% to about 1.2% by weight microspheres dispersed throughout the compounds. In some embodiments, the modeling compound further comprises vinylpyrrolidone polymers.

17 Claims, 7 Drawing Sheets
(2 of 7 Drawing Sheet(s) Filed in Color)

MODELING COMPOUNDS AND METHODS OF MAKING AND USING THE SAME

RELATED APPLICATIONS

This application is a continuation-in-part of U.S. application Ser. No. 13/446,413, filed Apr. 13, 2012, the content of which is incorporated herein by reference in its entirety.

BACKGROUND

1. Field

This patent specification relates to compositions, methods of making and methods of using modeling compounds. More particularly, this patent specification relates to compositions, methods of making and methods of using starch-based modeling compounds containing microspheres.

2. Background

Starch and water based dough have several disadvantages for use by children and artists. Starch and water based dough usually exhibit poor plasticity, and substantial shrinking upon drying. Other drawbacks include poor extrudability, limiting the use of extrusion tools and the shapes that can be created.

SUMMARY

Aspects of the present disclosure relate to a modeling composition comprising a starch-based binder, water, a retrogradation inhibitor and microspheres. According to some embodiments, the modeling composition can further comprise a surfactant. According to some embodiments, the modeling composition can further comprise a lubricant, salt, and a preservative.

According to some aspects of the disclosure, the modeling composition can comprise about 30% to about 60% by weight water, about 20% to about 40% by weight starch-based binder, about 2.0% to about 5.0% by weight lubricant, about 0.5% to about 4.0% by weight surfactant, about 5% to about 20% by weight salt, about 0.1% to about 1% by weight preservative, about 0.5% to about 5% by weight retrogradation inhibitor, 0% to about 1% by weight hardener, about 0.15% to about 1.2% by weight microspheres, 0% to about 10% by weight humectant, 0% to about 0.5% by weight fragrance, and 0% to about 5% by weight colorant.

In other aspects of the disclosure, the modeling composition can comprise about 30% to about 60% by weight water, about 20% to about 40% by weight starch-based binder, about 2.0% to about 8.0% by weight lubricant, about 0.5% to about 4.0% by weight surfactant, about 5% to about 20% by weight salt, about 0.1% to about 1% by weight preservative, about 0.5% to about 10% by weight retrogradation inhibitor, about 0.15% to about 1.2% by weight microspheres, about 0.5% to about 8% by weight vinylpyrrolidone polymers, 0% to about 15% polyols, 0% to about 1% by weight hardener, 0% to about 0.5% by weight fragrance, and 0% to about 5% by weight colorant.

According to some embodiments, the microspheres can be selected from the group consisting of one of pre-expanded microspheres, glass microspheres, or some combination thereof. The microspheres can be hollow microspheres, solid microspheres or some combination thereof. The microspheres can have a size ranging from about 20 microns to about 130 microns.

According to some embodiments, the starch-based binder can comprise gelatinized starch. According to some embodiments, the starch-based binder can be selected from a group consisting of one of wheat flour, rye flour, rice flour, tapioca flour or some combination thereof.

According to some embodiments, the salt can be selected from the group consisting of one of sodium chloride, calcium chloride, potassium chloride or some combination thereof.

According to some embodiments, the lubricant can be selected from the group consisting of one of mineral oil, vegetable oil, vegetable fat, triglycerides or some combination thereof.

According to some embodiments, the retrogradation inhibitor can comprise amylopectin. For example, the retrogradation inhibitor can be selected from the group consisting of one of waxy corn starch, waxy rice starch, waxy potato starch or some combination thereof. According to some embodiments, the retrogradation inhibitor can be crosslinked starch, modified starch, modified crosslinked starch or some combination thereof. For example, the retrogradation inhibitor can be crosslinked waxy maize starch, modified waxy maize starch, modified crosslinked waxy maize starch or some combination thereof. In some embodiments, the modeling composition can comprise up to 8 percent weight of retrogradation inhibitor, such as crosslinked starch, modified starch, modified crosslinked starch.

According to some embodiments, the surfactant can be selected from the group consisting of one of polyethylene glycol esters of oleic acid, polyethylene glycol esters of stearic acid, polyethylene glycol esters of palmitic acid, polyethylene glycol esters of lauric acid, ethoxylated alcohols, block copolymer of ethylene oxide, block copolymer of propylene oxide, block copolymer of ethylene and propylene oxides or some combination thereof.

According to some embodiments, the preservative is selected from the group consisting of one of calcium propionate, sodium benzoate, potassium sorbate, methyl paraben, ethyl paraben, butyl paraben or some combination thereof.

According to some embodiments, the hardener can be selected from the group consisting of one of sodium aluminum sulfate, potassium aluminum sulfate, aluminum ammonium sulfate, aluminum sulfate, ammonium ferric sulfate or some combination thereof.

According to some embodiments, the acidulant can be selected from the group consisting of one of citric acid, alum, potassium dihydrogen sulphate or some combination thereof.

Aspects of the present disclosure relate to a method of preparing a starch-based modeling compound. According to some embodiments, the method comprises providing a mixer, adding in the mixer and mixing about 30% to about 60% by weight water, about 20% to about 40% by weight starch-based binder, about 2.0% to about 5.0% by weight lubricant, about 0.5% to about 4.0% by weight surfactant, about 5% to about 20% by weight salt, about 0.1% to about 1% by weight preservative, about 0.5% to about 5% by weight retrogradation inhibitor, 0% to about 1% by weight hardener, about 0.15% to about 1.2% by weight microspheres, 0% to about 10% by weight humectant, 0% to about 0.5% by weight fragrance, and 0% to about 5% by weight colorant.

According to some embodiments, the ingredients can be mixed to form a first mixture prior to adding water to the first mixture, and the water can be heated prior to adding the water to the first mixture.

According to some embodiments, the method comprises providing a mixer, adding the following ingredients to the mixer and mixing: about 20% to about 40% by weight starch-based binder, about 5% to about 20% by weight salt, about 0.1% to about 1% by weight preservative, about 0.5% to about 8% by weight retrogradation inhibitor, 0% to about 1% by weight hardener, adding the following ingredients and mixing: about 2.0% to about 8.0% by weight lubricant, about 0.5% to about 4.0% by weight surfactant, adding the following ingredients and mixing: about 30% to about 60% by weight water, about 0.15% to about 1.2% by weight microspheres, adding 0% to about 15% polyols and mixing; and optionally adding % to about 0.5% by weight fragrance and 0% to about 5% by weight colorant and mixing to form the starch-based modeling compound.

Further features and advantages will become more readily apparent from the following detailed description when taken in conjunction with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure is further described in the detailed description which follows, in reference to the noted plurality of drawings by way of non-limiting examples of exemplary embodiments, and wherein:

FIG. 4A shows the shrinkage of the modeling compound in the absence of glycerine in function of time (days). FIG. 4B shows the shrinkage of the modeling compound in the presence of 5% glycerine in function of time (days). FIG. 4C shows the shrinkage of the modeling compound in the presence of 10% glycerine in function of time (days). FIG. 4D shows the shrinkage of the modeling compound in the presence of 15% glycerine in function of time (days).

FIG. 5A shows a patterned substrate according to some embodiments. FIG. 5B shows the patterned substrate after application of the modelling compound according to some embodiments. FIG. 5C shows the creation of artwork on a substrate using the modeling compound according to some embodiments.

FIG. 6A shows the different parts of an unassembled birdhouse to be assembled according to some embodiments. FIG. 6B shows the birdhouse assembled using the modeling compound according to some embodiments. FIG. 6C shows the decorated birdhouse using the modeling compound according to some embodiments.

Figure 1:
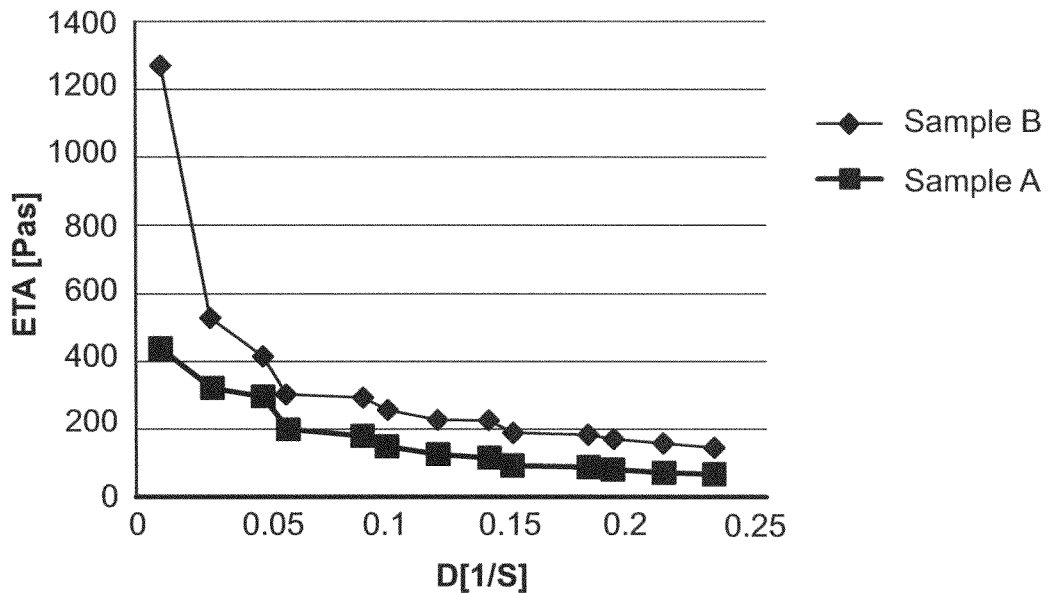
FIG. 1 shows a viscosity curve in accordance with some embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems, processes, and other elements in the invention may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Aspects of the present disclosure relate to starch-based modeling compounds and methods for preparing starch-based modeling compounds. Other aspects of the present disclosure relate to methods of using modeling compound. As used herein, the terms "modeling compound" and "modeling dough" are used interchangeably.

The starch or starch-based binder defining the matrix of the modeling compound can be selected from, for example, wheat flour, rye flour, rice flour, tapioca flour, and the like and combinations thereof. Starch is the primary source of stored energy in cereal grains. Starches are composed primarily of amylose, a comparatively low molecular weight straight-chain carbohydrate, and/or amylopectin, a branched carbohydrate having a much higher molecular weight and, in solution, a higher viscosity. For example, wheat starch contains about 25% amylose and about 75% amylopectin; and tapioca starch contains about 17% amylose and about 83% amylopectin. (Percentages herein refer to percentage by weight, unless otherwise specified). Waxy starches contain at least about 90% amylopectin. Waxy corn starch, for example, contains less than about 1% amylose and greater than about 99% amylopectin.

Amylose and amylopectin do not exist free in nature, but as components of discrete, semicrystalline aggregates called starch granules. It is the crystalline regions that give the starch granule its structure and facilitate identification of uncooked starch.

The presence of numerous hydroxyl groups in starch allows for the hydration of starch through hydrogen bonding. For example, high amylose starch can be gelatinized by steam jet cooking at 140° C. The hydration process in presence of heat produces a change in the structure of the starch granule. The starch-starch molecular interactions are disrupted and replaced by starch-water interactions. When an aqueous starch dispersion is heated, gelatinization occurs, during which the crystal structure of starch granules is disrupted, and the starch granules absorb water and hydrate, and produces a viscous hydrocolloidal solution. As used herein, the term "gelatinization" refers to the disruption of molecular orders within the starch granule, manifested in changes in properties such as granular swelling, native crystallite melting, loss of birefringence, and starch solubilization. Starch gelatinization generally refers to the process that breaks down the association of starch molecules, in the presence of water and heat. The absorption of water, which acts as a plasticizer, and formation of hydrogen bonding with water decreases the number of and size of crystalline regions of starch granules.

In some embodiments, the starch-based modeling dough includes gelatinized starch. There is a need for a starch-based modeling compound that has a soft, flexible texture, low viscosity, and resists retrogradation and hardening over time.

Amylose fractions will upon cooling form crystalline aggregates by hydrogen bonding or retrogradation. Retrogradation is a process involving reassociation of starch molecules that occurs after a freshly-made starch gel is cooled. During retrogradation, stable hydrogen bonding forms between linear segments of amylose producing an aggregate or gel network, which can depend upon the concentration of amylose in the product.

Amylopectin starch is known to be resistant to retrogradation. However, when amylopectin is mixed with water and heated, it tends to form a paste having a sticky texture, rather than a soft gel, which is desired for a modeling compound. A sticky texture in a modeling compound may cause the modeling compound to be messy for the user to manipulate, as the compound is more likely to stick to hands, molds, toys, furniture, and carpeting. Yet, in some embodiments, the composition of the modeling compound is designed to adhere to a substrate to allow the creation of artwork.

The processes of gelatinization and retrogradation affect the characteristics of starch-containing products, such as starch-based modeling compounds. During manufacturing of starch-based modeling compounds, gelatinization occurs, forming modeling compounds that are soft, and easy to manipulate and shape, due to their soft texture and low viscosity. However, retrogradation begins to occur shortly after manufacturing, and is usually well advanced in as little as 48 hours. Retrogradation causes significant hardening of starch-based modeling compounds and increases viscosity. The hardening and increasing of viscosity of the modeling compounds is undesirable because the hardened compounds are more difficult to manipulate and shape, particularly by young children.

Accordingly some aspects of the present disclosure refer to starch-based modeling compound that is soft, flexible, and extrudable, has a low viscosity, and is not sticky. Yet, other aspects of the present disclosure relate to starch-based modeling compound that is soft, flexible, and easily extrudable, has a low viscosity and has adhesive properties.

In some embodiments, the modeling compound comprises from about 20 weight percent to about 50 weight percent of starch-based binder. In some embodiments, the starch-based binder comprises gelatinized starch. For example, the starch-based binder can comprise starch that is at least 50%, at least 75%, or at least 95% gelatinized starch.

In some embodiments, the starch-based modeling compound comprises a retrogradation inhibitor. For example, the modeling compound can comprises up to 5 weight percent, or up to 10 weight percent retrogradation inhibitor. In some embodiments, the starch-based modeling compound comprises from 0.5 weight percent to 7.5 weight percent retrogradation inhibitor. The retrogradation inhibitor can comprise amylopectin. The retrogradation inhibitor can comprise a waxy starch. For example, the retrogradation inhibitor can be selected from waxy corn starch, waxy rice starch, waxy potato starch, crosslinked starch, modified starch and combinations thereof. In some embodiments, the retrogradation inhibitor can comprise up to 8 weight percent crosslinked cornstarch or modified crosslinked cornstarch. Any crosslinked starch that can improve binding, that does not hydrolyse at low pH (e.g. pH of less than 4) and has a stable viscosity at elevated temperatures (e.g. 70° C. to 80° C.) can be used. For example, the retrogradation inhibitor can comprise crosslinked waxy maize starch, stabilized and crosslinked waxy maize starch, stabilized and low to moderately crosslinked waxy maize starch, stabilized and highly crosslinked waxy maize starch or a combination thereof. One skilled in the art will appreciate that the addition of crosslinked starch can improve binding to from a homogenous dough, provide thickening, provide stable viscosity under low pH and increased heating conditions, provide high shear tolerance, increase the stability of the modeling compound. Accordingly, the modeling compound can have an improved texture. In some embodiments, the retrogradation inhibitor can comprise waxy maize starch, waxy corn starch, waxy rice starch, waxy potato starch, crosslinked starch, crosslinked waxy maize starch, stabilized and crosslinked waxy maize starch, stabilized and highly crosslinked waxy maize starch, amylopectin or a combination thereof.

Generally, air-dryable starch-based modeling compounds have a tendency to crack, flake, crumble and shrink upon drying. Because water content is relatively high in the wet stage of the dough, water loss upon drying, results in a commensurate volume loss in the finished molded piece. In addition, since wet, starch-based modeling compounds have a relatively low plasticity and high rheological values, it can be difficult for the users to extrude and can limit the users in the range of designs, shapes that can be created.

Aspects of the present disclosure relate to a starch-based modeling compound with high degree of plasticity, ductility and extrudability when wet and low tendency to crack and limited volume shrinkage upon drying. Such modeling compounds may be used by small children and artists in general. In some embodiments, the modeling compound disclosed herein may be used using extrusion apparatus to form a variety of shapes, articles or artwork, such as designs on a substrate.

As used herein the term "viscosity" refers to the measure of the internal friction of a fluid, i.e. when a layer of fluid is made to move relative to another layer. The greater the friction the greater the amount of force required to cause this movement also referred herein as shear. Shearing occurs when the fluid is physically moved by pouring, spreading, mixing, etc. In general, viscosity is proportional to the force necessary to cause a substance to flow.

It will be appreciated that the modeling compounds disclosed herein can have pseudoplastic properties. As such, the modeling compounds described herein can have the capability of changing apparent viscosity with a change in shear rate. For example, the viscosity of the modeling compound described herein can increase when the shear rate decreases and vice versa.

It is also understood that the modeling compounds described herein can be thixotropic, that is that the viscosity of the modeling compounds can decrease when shear rate is constant.

The rheological properties of the modeling compounds can be achieved by varying the starch binder, the filler, the retrogradation inhibitor, the surfactant, the water and other components or additives relative to one another and their relative proportion. Desirable rheological properties of the modeling compounds include, among others, pliability, extrudability, and reduced viscosity. For example, water content, and production temperature can have a significant impact on the viscosity of the modeling compound. Addition of microspheres, retrogradation inhibitor, surfactant and any combinations of any of the foregoing can also have a significant impact on the viscosity and extrudability of the modeling compound.

Additional desirable properties of the modeling compounds include, but are not limited to, for example, color stability, long usage time and storage stability.

Microspheres

According to some embodiments, the modeling compound comprises microspheres. The microspheres can be solid or hollow. For example, the modeling compound comprises hollow microspheres that can be dispersed as filler in the modeling compound comprising starch as a matrix. In some embodiments, the modeling composition comprises from about 0.15 weight percent to about 1.2 weight percent of microspheres. As used herein, the term "microsphere" relates to non-toxic particles having a spherical or generally spherical shape with a diameter ranging from about 1 micron to about 100 microns, or from about 1 to about 500 microns, or from about 1 to about 1,000 microns. In some embodiments, the microspheres used in the composition have a particle size ranging from about 30 to about 60, from about 30 to about 100, from about 30 to about 150, from about 90 microns to about 130 microns. Microspheres with larger diameter may be used and may be desirable depending on the desired consistency of the modeling compound.

Examples of microspheres include, but are not limited to, ceramic microspheres, silica alumina alloy microspheres, plastic microspheres, glass microspheres and combinations thereof. An example of glass microspheres may include those made of soda lime borosilicate glass or the like, such as Scotchlite™ Type K or S, for example K-25, from 3M Corporation. An example of ceramic microspheres may include fly ash microspheres or the like, such as Zeospheres from 3M Corporation. An example of thermoplastic microspheres include those made of acrylonitrile/vinylidene chloride copolymers from Akzo-Nobel, such as Expancel® DE microspheres (such as Expancel® 920DET40d25) and acrylonitrile copolymer microspheres from Matsumoto (such as Micropearl® F-80DE). In some embodiments, a mixture of more than one glass, ceramic, thermoplastic, and thermoset plastic microspheres can be used to obtain one or more desired mechanical properties.

Hollow plastic microspheres can be made from a variety of materials and are generally available in sizes ranging from 10 to 1000 micron diameter and densities ranging from 0.022 to 0.2 g/cc. Any of these materials, or combination of such materials, may be employed for the purpose of achieving particular combination of properties.

In some embodiments, pre-expanded microspheres having an acrylonitrile copolymer shell encapsulating volatile hydrocarbon are used. The copolymer shell can comprise various copolymers selected from, but not limited to, polyvinyldiene chloride, acrylonitrile, and acrylic ester. Such microspheres can have a size ranging from about 20 to about 200 microns and a true specific gravity of 0.022.

The low density of hollow microspheres can reduce the overall density of the dough comprising the hollow microspheres since water and the rest of the components have much higher densities. Microspheres remain intact during the manufacturing process because mixing and pumping equipment do not exert enough force to fracture them.

In some embodiments, the composition of the modeling compound has a concentration of microspheres ranging from about 0.15% to about 1.2% by weight. In some embodiments, up to 2%, up to 3%, up to 4%, up to 5%, up to 6% by weight. In some embodiments, the weight content of hollow microsphere can be optimized according to a desired property of the modeling compound, such as ease of formability, ease of extrusion, stickiness, shape preservation etc. According to some embodiments, the microspheres can make from about 20 to about 25% of the volume of the modeling compound due to the low actual partial volume of the water. While the weight percent of the water in the modeling compound can be high (e.g. from about 30% to about 60%), the actual partial volume of the water is relatively low due to the relatively high density of the water (1.0 g/cc) and the low density of the microspheres. For example, the microspheres can occupy about 22% of the modeling compound by volume. As a result, upon evaporation of the water during the drying step, the modeling dough made with microspheres shrinks less than modeling dough made without microspheres, resulting in improved shape preservation and dimensional stability of the molded shape.

In some embodiments, the modeling composition comprising microspheres can change the mechanical properties resulting in a starch-based modeling compound being softer, more flexible, easier to extrude and having low viscosity. For instance, the starch-based modeling compound according to some embodiments comprising microspheres and retrogradation inhibitor can have a viscosity of, for example, from about 250 Pascal seconds to about 500 Pascal seconds, in comparison to a conventional starch-based compound including retrogradation inhibitor but not including microspheres, which can have a viscosity of, for example, from about 1,300 Pascal seconds to about 1,500 Pascal seconds (See FIG. 1).

Due to the shape and size of the microspheres, the microspheres can offer a ball-bearing effect and the space that is not occupied by the microspheres can accommodate water and the other components of the modeling compound mixture so as to be movable during modeling.

Furthermore, such compositions make the modeling compound easier to use. For example, extrusion force that needs to be applied by the users when using extrusion device can be significantly reduced. Such modeling compounds can be used to form a variety of shapes (such as geometric and non-geometric shapes, linear and non-linear shapes, etc.), articles or artwork. These modeling compounds may be molded with tools, by hand, by molds or using extrusion devices to form a variety of shapes, articles or artwork, as noted above. Artists can use extrusion devices to fashion modeling compounds into a wide variety of desirable shapes, such as, animals, flowers, and artwork or to form fanciful designs and the like. Examples of tools, include, but are not limited to, a decorating gun, a ribbon extruder tool, hand held food extruder and the like to create designs, and decorations, such as cake decoration. In addition, the modeling compound can be used in a pen-like device or any device capable of applying the modeling compound onto a surface, such as paper, to produce art like effects.

In some embodiments, the microspheres appear white so as not interfere with the coloration to the modeling compound.

Modeling Compound Compositions

According to some embodiments, the starch-based modeling compound can comprise (1) about 30% to about 60% by weight of water; (2) about 5% to about 20% by weight of salt; (3) about 2.0% to about 5% by weight of lubricant; (4) 0.5% to about 4.0% by weight of surfactant; (5) about 20% to about 40% by weight of starch-based binder; (6) 0.5% to about 5% by weight of retrogradation inhibitor; (7) 0.1% to about 1% by weight of preservative and (8) about 0.15% to about 1.2% by weight of microspheres.

According to other embodiments, the starch-based modeling compound can comprise (1) about 30% to about 60% by weight of water, (2) about 5% to about 20% by weight of salt, (3) about 2.0% to about 8% by weight of lubricant, (4) 0.5% to about 4.0% by weight of surfactant, (5) about 20% to about 40% by weight of starch-based binder, (6) 0.5% to about 10% by weight of retrogradation inhibitor, (7) 0.1% to about 1% by weight of preservative and (8) about 0.15% to about 1.2% by weight of microspheres.

In some embodiments, the composition can include up to about 1% by weight of hardener. In some embodiments, the composition can include up to about 10% or up to 15% by weight of humectant. In some embodiments, the composition can include up to about 0.5% by weight of fragrance. In some embodiments, the composition can include up to about 3.5% by weight of colorant.

The water generally meets the National Primary Drinking Water Specifications. In some embodiments, the modeling compound comprises from about 30 weight percent to about 60 weight percent of water. Water can act as a plasticizer, to increase the plasticity of the modeling compound.

The salt can be selected from, for example, sodium chloride, calcium chloride, and potassium chloride. The presence of the salt can reduce amount of water needed for hydration for starch. In some embodiments, the salt can provide the modeling compound with antimicrobial characteristics. In some embodiments, the modeling compound comprises from about 5 weight percent to about 20 weight percent of salt.

A preservative can also be added to increase the shelf life of the modeling compound. The preservative can be selected from, for example, calcium propionate, sodium benzoate, potassium sorbate, methyl paraben, ethyl paraben, butyl paraben, and combinations thereof. The preservative can also be any other appropriate preservative known to those skilled in the art, such as one or more preservative compounds that inhibit mold growth at a pH of less than about 4.5, used alone or in combination. It should be appreciated that the presence of salt can also inhibit microbial growth.

The lubricant can be selected from, for example, mineral spirits, mineral oil, vegetable oil, vegetable fat and combinations thereof. The mineral oil can be, a triglyceride derived from vegetable oil or caprylic/capric triglyceride. In some embodiments, the lubricant is a combination of mineral oil and triglycerides. Such lubricant combination, according to some embodiments, provides for a less oily modeling compound. The lubricant can act to prevent the dough from becoming sticky and to impart softness and smoothness to the dough. Another function of this component is to facilitate separation of the molded article from the tool used for molding. In some embodiments, the modeling compound comprises from about 2 weight percent to about 5 weight percent of lubricant or from about 2 weight percent to about 8 weight percent of lubricant.

Figure 2:
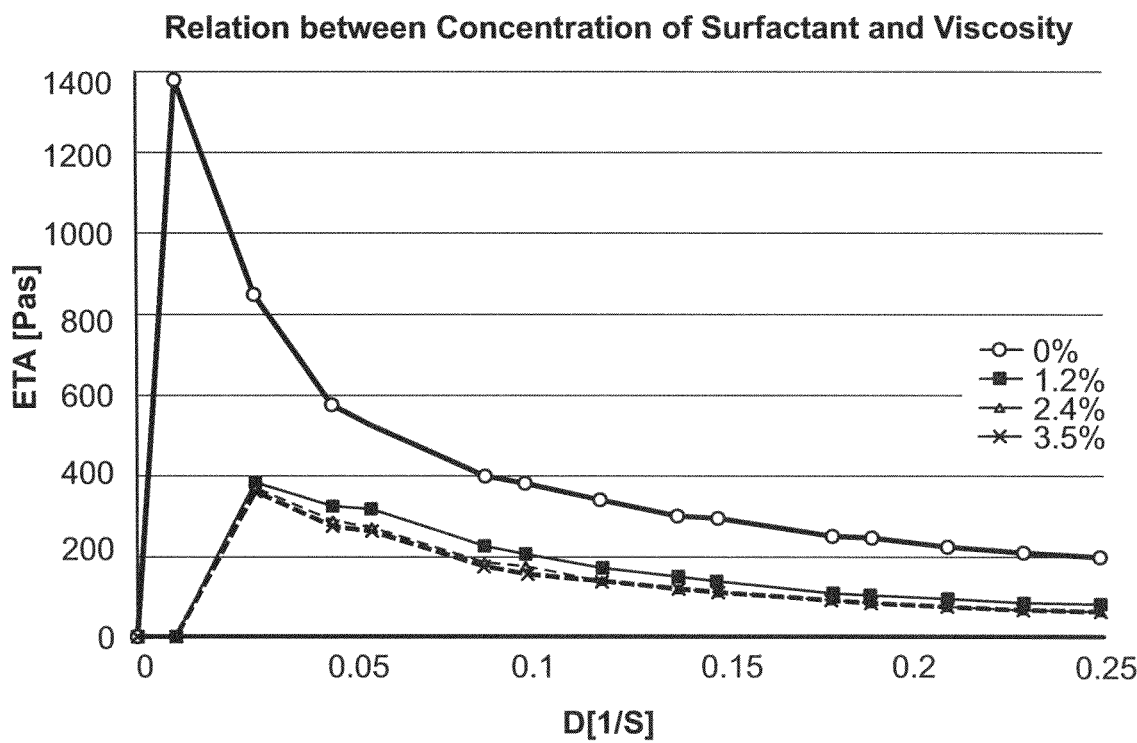
FIG. 2 shows a viscosity curve in accordance with some embodiments.

The surfactant can be selected from, for example, polyethylene glycol esters of oleic acid (e.g. Tween 80), polyethylene glycol esters of stearic acid (e.g. Tween 60), polyethylene glycol esters of palmitic acid (e.g. Tween 40), polyethylene glycol esters of lauric acid (e.g. Tween 20), ethoxylated alcohols (for example, Neodol 23-6.5, Shell Chemicals), block copolymer of ethylene oxide or propylene oxide. In some embodiments, the surfactant has a hydrophilic lipophile balance (HLB) of about 12-20. In some embodiments, the surfactant can be any difunctional block copolymer surfactant capable of wetting the microspheres and being hydrophilic. For example, the surfactant can be a difunctional block copolymer surfactant having a HLB ranging from about 1 to about 7. Such properties can allow for plasticization of the modeling compound and can help the microspheres to stay embedded into the modeling compound. In some embodiments, the modeling compound comprises up to 1%, up to 2%, up to 3% or up to about 4% weight of surfactant. For example, the modeling compound can comprise 1.2% difunctional block copolymer surfactant. In some embodiments, the presence of surfactant can lower the viscosity of the modeling compound. For example, the viscosity of a modeling compound comprising a surfactant, such as for example, 1.2% difunctional block copolymer surfactant, can be half that of the viscosity of the same compound which does not include the surfactant (FIG. 2). In addition the surfactant can aid the extrusion of the modeling compound.

In some embodiments, the combination of lubricant and surfactant can reduce the stickiness of the starch-based modeling compound. In some embodiments, the lubricant has a low enough viscosity so that the modeling compound does not feel objectionably oily.

In some embodiments, the modeling compound can include a hardener. For example, the modeling compound can include up to 1 weight percent of hardener. The hardener can be selected from, for example, sodium aluminum sulfate, potassium aluminum sulfate, aluminum ammonium sulfate, aluminum sulfate, and ammonium ferric sulphate or the like.

In some embodiments, the modeling compound can also include an acidulant. The acidulant can be selected from, for example, citric acid, alum, potassium dihydrogen sulphate or some combinations thereof. However, any known nontoxic acid can be used. The modeling compound can have a pH of about 3.5 to about 4.5. The modeling compound can have a pH of about 3.8 to about 4.2.

In some embodiments, the modeling compound can include a humectant or hygroscopic additive. Hygroscopic additives have the ability to attract and hold water molecules through absorption or adsorption, thereby increasing the adhesive physical characteristic of the modeling compound. In some embodiments, the modeling compound can include polyols. For example, the modeling compound can comprise glycerine, sorbitol, propylene glycol or any other polyol or a combination thereof. Humectants can also reduce brittleness of the dried dough, reduce shrinkage of the artwork, and slow drying to increase working time. Some humectants can also act as a plasticizer, to increase the plasticity of the modeling compound.

The fragrance can be, for example, any water-dispersible or oil-dispersible nontoxic fragrance wherein the fragrance can be either pleasing (i.e., flower, food, etc.) or not pleasing (i.e., bitter, etc.) to a human's smell.

A colorant may be included to the modeling compound. The colorant can include, for example, any nontoxic dyes, pigments, phosphorescent pigments, or macro-sized particles such, as glitter or pearlescent materials.

In some aspects, certain desirable features of the modeling compound include adequate flowability and pliability to be extruded with a hand held extruder, adequate wet track to be applied onto a substrate to form a three dimensional pattern, and adequate adhesion onto the substrate. In some embodiments, the modeling compound has adequate sag resistance so that applied three dimensional artwork obtained by extruding the modeling compound do not sag. In some embodiments, the modeling compound is sufficiently extrudable to be extruded homogenously to form a homogenous three-dimensional design (line, bead, etc. . . . ) on a substrate or surface.

In some embodiments, the modeling compound can have adhesive properties and flow resistance properties such that the modeling compound can stay in place after application and/or to enable application of the modeling compound on a vertical substrate. In some embodiments, the modeling compound can include additives that allow it to function as an adhesive, especially when creating three dimensional artwork (see FIG. 5B, FIG. 5C, FIG. 6A and FIG. 6B).

Some additives can be used to provide the desired adhesive properties of the modeling compound. In some embodiments, the modeling compound can include water soluble vinylpyrrolidone polymers, water soluble vinylpyrrolidone copolymers, or a combination thereof. In some embodiments, the vinylpyrrolidone polymers can be vinylpyrrolidone homopolymers, vinylpyrrolidone copolymers and some combination thereof. Vinylpyrrolidone polymers having a molecular weight ranging from 40,000 to 3,000,000 can be used. In some embodiments, vinylpyrrolidone polymers having a molecular weight from about 900,000 and 1,500,000 can be used. Vinylpyrrolidone polymers and/or copolymers have adhesive and binding powers, thickening properties and an affinity to hydrophilic and hydrophobic surfaces. In some embodiments, the modeling compound includes a combination of polyols and vinylpyrrolidone polymers and/or copolymers. For example, the modeling compound can comprise glycerine, sorbitol, propylene glycol or any other polyol or a combination thereof. In some embodiments, the modeling compound can include glycerine, vinylpyrrolidone polymers and/or copolymers, or a combination thereof. Without being bound by the theory, it is believed that the combination of polyols such as glycerine and vinylpyrrolidone polymers and/or copolymers, contribute to the flow resistance of the modeling compound and to the adhesion of the modeling compound to the substrate. The addition of polyols such as glycerine to the modeling compound is believed to improve the adhesive properties of the compound comprising vinylpyrrolidone polymers and/or copolymers to substrates and to reduce the shrinkage of the dried design. In addition, presence of glycerine in the modeling compound can improve the function of the modeling compound under arid conditions, for example when used indoors, by helping to maintain the moisture content of the modeling compound.

In some aspect, the modeling compound comprising the combination of glycerine and vinylpyrrolidone polymers and/or copolymers has an adhesive property permitting the modeling compound to adhere onto a variety of substrates. For example, the modeling compound can, in some embodiments, comprise about 30% to about 60% by weight water, about 20% to about 40% by weight starch-based binder, about 2.0% to about 8.0% by weight lubricant, about 0.5% to about 4.0% by weight surfactant, about 5% to about 20% by weight salt, about 0.1% to about 1% by weight preservative, about 0.5% to about 10% by weight retrogradation inhibitor, about 0.15% to about 1.2% by weight microspheres, about 0.5% to about 8% by weight vinylpyrrolidone polymers, 0% to about 15% polyols, 0% to about 1% by weight hardener, 0% to about 0.5% by weight fragrance, and 0% to about 5% by weight colorant. The substrate can be for example, paper, cardboard, plastic, glass, wood, rubber, fabric etc. . . . Such adhesive properties allow the user to decorate a variety of objects or to deposit the modeling compound onto a printed pattern depicting a predetermined item (e.g. flower, animal etc. . . . ) (see FIG. 5A, FIG. 5B, and FIG. 6C). In some embodiments, the modeling compound can be used to create a three-dimensional artwork without the use of additional adhesive or glue (see FIG. 6B and FIG. 6C).

Methods of Making

According to some aspects of the present disclosure, a method of preparing a starch-based modeling compound includes the steps of: (a) providing a mixer; and (b) adding the following ingredients to the mixer: (1) about 30% to about 60% by weight of water; (2) about 5% to about 20% by weight of salt; (3) about 2.0% to about 5% by weight of lubricant; (4) about 0.5% to about 4.0% by weight of surfactant; (5) about 20% to about 40% by weight of starch-based binder; (6) about 0.5% to about 5% by weight of retrogradation preventing agent; (7) about 0.1% to about 1% by weight of preservative and (8) about 0.15% to about 1.2% by weight of microspheres; and (c) mixing the ingredients.

In some embodiments, the ingredient can optionally also include up to about 1% by weight hardener; up to about 10% by weight humectant; up to about 0.5% by weight fragrance; and up to about 5% by weight colorant.

In some embodiments, salt, lubricant, surfactant, starch-based binder, preservative, retrogradation inhibitor, microspheres and optionally, fragrance, colorant, hardener, and humectant can be mixed to form a first mixture. Water can be heated to sufficiently gelatinize starch before being added to the first mixture to form a second mixture. The temperature is then cooled at room temperature.

Any suitable mixer known to those skilled in the art can be used, such as an ordinary bakery dough mixer or any suitable stainless steel mixer.

According to other aspects of the present disclosure, a method of preparing a starch-based modeling compound includes the steps of: (a) providing a mixer, and (b) adding the following ingredients to the mixer: (1) about 30% to about 60% by weight of water; (2) about 5% to about 20% by weight of salt; (3) about 2.0% to about 8% by weight of lubricant; (4) about 0.5% to about 4.0% by weight of surfactant; (5) about 20% to about 40% by weight of starch-based binder; (6) about 0.5% to about 10% by weight of retrogradation inhibitor; (7) about 0.1% to about 1% by weight of preservative, (8) about 0.15% to about 1.2% by weight of microspheres, (9) about 0.5% to about 8% of vinylpyrrolidone polymer or copolymer, (10) up to about 15% polyols and (11) up to about 1% by weight hardener; and (c) mixing the ingredients.

In some embodiments, the ingredient can optionally also include up to about 0.5% by weight fragrance; and up to about 5% by weight colorant.

In some embodiments, salt, starch-based binder, preservative, retrogradation inhibitor, microspheres and optionally, hardener, and vinylpyrrolidone polymers and/or copolymers can be mixed to form a first mixture. Block copolymer surfactant, and lubricant can be subsequently added to from a second mixture. Microspheres can then be added to the second mixture to from a third mixture. Water can be heated before being added to the third mixture to form a fourth mixture. The polyol can then be added to the fourth mixture. Any suitable mixer known to those skilled in the art can be used, such as an ordinary bakery dough mixer or any suitable stainless steel mixer.

According to other aspects of the present disclosure, a method of preparing a starch-based modeling compound includes the steps of: (a) providing mixer, (b) adding the following ingredients to the mixer: salt, hardener, preservative, starch-based binder, retrogradation inhibitor, vinylpyrrolidone polymers and/or copolymers, (c) mixing the ingredients, (d) adding block copolymer surfactant, and lubricant, (e) mixing the ingredients, (f) adding the microspheres, (g) adding water, (h) mixing the ingredients, (i) adding the glycerine, (j) mixing the ingredients, and (k) optionally adding the fragrance and mixing. In some embodiments, the mixer can be preheated to, for example, 70° C., before adding the ingredients. In some embodiments, water can be heated, for example at 80° C. before being added to the mixture. In some embodiments, the ingredients can be mixed for 3 minutes at step (c) and at step (e), for 4 minutes at step (h), and for 1 minute at step (j) and (k).

Process of Using

It should be appreciated that the composition of the compounds of the present disclosure can make the modeling compound easier to use. For example, extrusion force that needs to be applied by the users when using extrusion device can be significantly reduced, making it easier to be used by children and artists. Such modeling compounds can be used to form a variety of shapes (such as geometric and non-geometric shapes, linear and non-linear shapes, etc.), articles or artwork. These modeling compounds may be molded with tools, by hand, by molds or using extrusion devices to form a variety of shapes, articles or artwork, as noted above. Artists can use extrusion devices to fashion modeling compounds into a wide variety of desirable shapes, such as, animals, flowers, and artwork or to form fanciful designs and the like. Examples of tools, include, but are not limited to, a decorating gun, a ribbon extruder tool, hand held food extruder and the like to create designs, and decorations, such as cake decoration. In addition, the modeling compound can be used in a pen-like device or any device capable of applying the modeling compound onto a surface, such as paper, to produce art like effects.

Figure 5A:
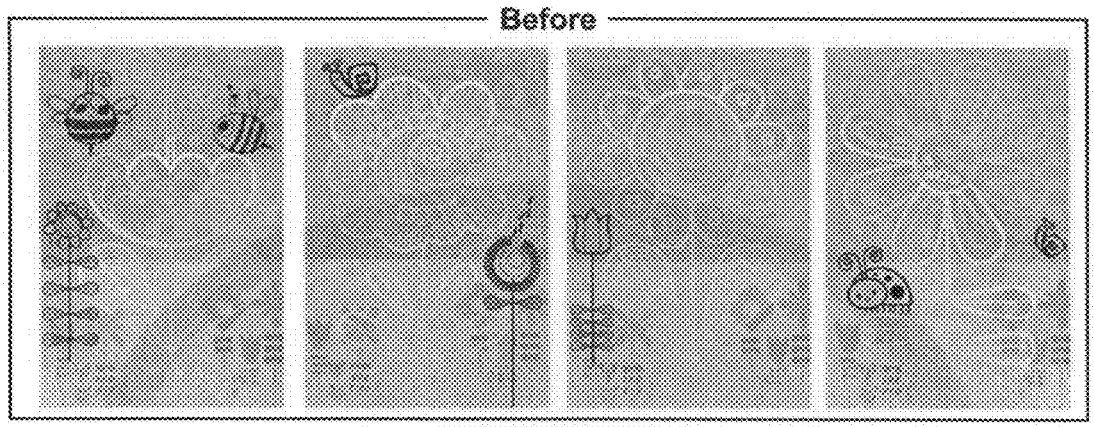
FIGS. 5A, 5B and 5C show the creation of artwork on a substrate using the modeling compound according to some embodiments.
Figure 5B:
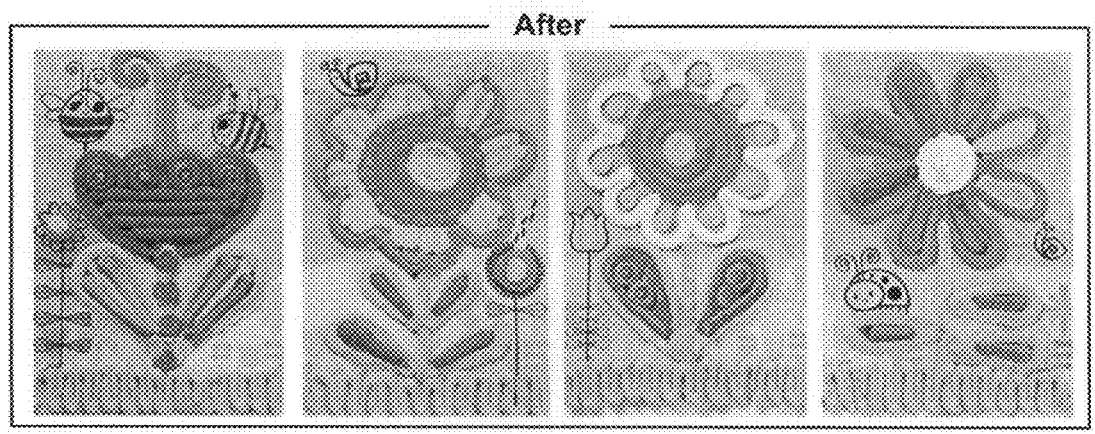
Figure 5C:
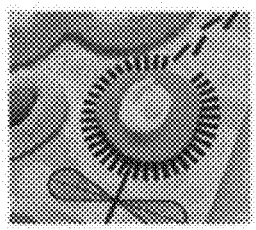
Figure 6A:
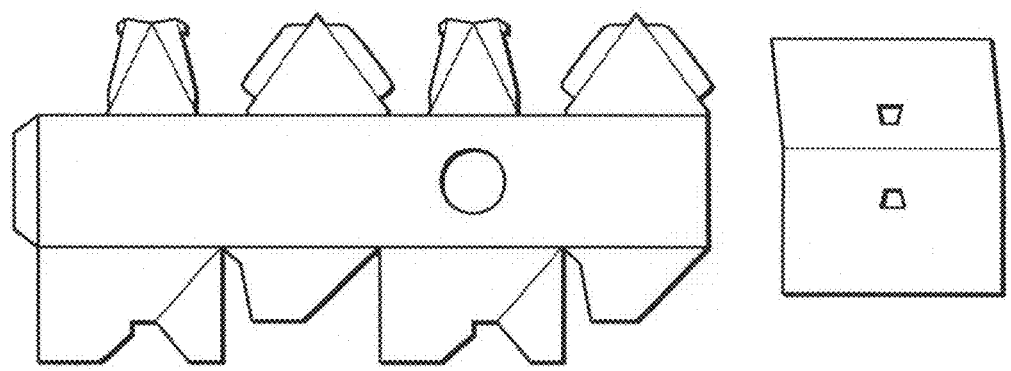
FIGS. 6A, 6B and 6C show the creation of artwork using the modeling compound according to some embodiments.
Figure 6B:
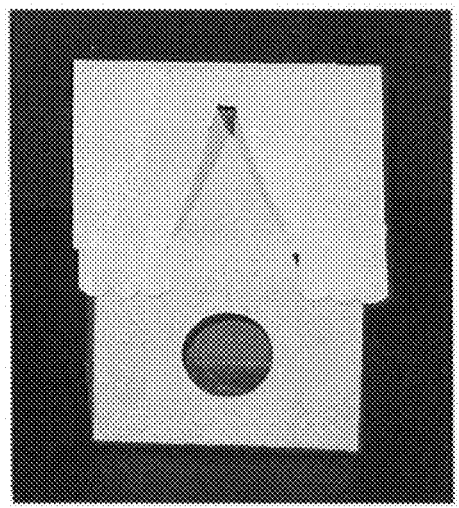
Figure 6C:
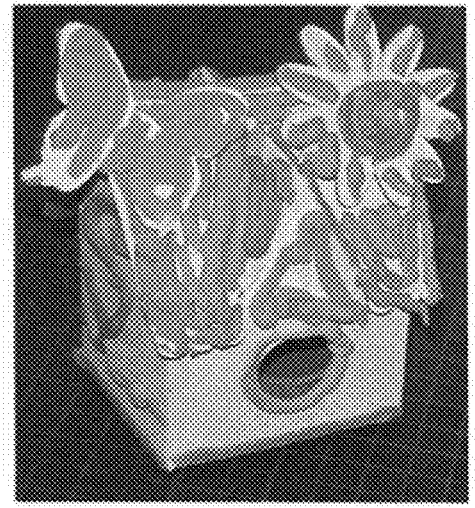

In some embodiments, the modeling compound can be deposited onto a substrate and allowed to remain undisturbed for a suitable period of time to allow the modeling compound to dry and adhere onto the substrate. In some embodiments, the modeling compound can act as an adhesive. In some aspect, the modeling compound has an adhesion property permitting the modeling compound to adhere onto a variety of substrates or to be glued together to form a three dimensional artwork. The substrate can be for example, paper, cardboard, plastic, glass, wood, rubber, fabric etc. . . . Such adhesive properties allow the user to decorate a variety of objects or to deposit onto a printed pattern depicting a predetermined item (e.g. flower, animal etc. . . . ) (FIG. 5A). In some embodiment, the modeling compound can be used as an adhesive or glue to piece together different parts of artwork and form a three dimensional artwork (FIG. 6A and FIG. 6B).

In some aspects, the modeling compound can be manipulated using an applicator, such as stampers (to, for example, stamp patterns into compound, a roller cutter, a sculpting tools, a squeegee (to, for example, squeegee compound into recessed/embossed design or to just clean compound away from surface), a pattern roller (to, for example, roll patterns into compound) or a pen-like device. In some aspects, the modeling compound can be extruded using an extruder, a caulk gun style extruder (such as a pump action extruder) or a half mold press extruder (to, for example, squeeze and mold flowers, butterflies, hearts, charms, etc. onto a surface).

In some embodiments, the modeling compound can be used to form a three dimensional artwork. In some embodiments, if the compound is neon, the modeling compound can be used to form a black light artwork display that can light up under LED lights.

EXAMPLES

The present disclosure will be described with reference to the following examples, however the present disclosure is by no means limited to these examples.

Example 1

Exemplary Formulation of the Modeling Compounds

Table 1 through Table 5 below provide exemplary formulations for the starch-based modeling compound according to first aspect of the disclosure in weight percent of the total compound.

Table 1 provides an exemplary formulation for the instant starch-based modeling compound in weight percent of the total compound comprising a starch-based binder, a retrogradation inhibitor such as waxy maize starch, a difunctional block copolymer surfactant and pre-expanded microspheres.

TABLE 1

Formulation of the modeling compound 1

| INGREDIENT | Modeling Compound 1 Weight Percent |
|---|---|
| SODIUM CHLORIDE | 6.067 |
| CALCIUM CHLORIDE | 6.067 |
| ALUMINUM SULFATE | 0.600 |
| POTASSIUM SORBATE | 0.300 |
| SODIUM BENZOATE | 0.200 |
| STARCH-BASED BINDER: FLOUR | 30.000 |
| WAXY MAIZE STARCH (C-GEL 04230) | 2.333 |
| BLOCK COPOLYMER SURFACTANT | 1.200 |
| F-80DE MICROPEARL ® | 0.600 |
| VEGETABLE OIL | 1.667 |
| MINERAL OIL | 1.667 |
| WATER | 49.167 |
| FRAGRANCE | 0.033 |
| PIGMENT | 0.100 |
| TOTAL | 100.000 |

Table 2 provides an exemplary formulation for the instant starch-based modeling compound in weight percent of the total compound comprising a starch-based binder, a retrogradation inhibitor such as waxy maize starch, a conventional non-ionic surfactant and pre-expanded microspheres.

TABLE 2

Formulation of the modeling compound 2

| INGREDIENT | Modeling Compound 2 Weight Percent |
|---|---|
| SODIUM CHLORIDE | 6.067 |
| CALCIUM CHLORIDE | 6.067 |
| ALUMINUM SULFATE | 0.600 |
| POTASSIUM SORBATE | 0.300 |
| SODIUM BENZOATE | 0.200 |
| STARCH-BASED BINDER: FLOUR | 30.000 |
| WAXY MAIZE STARCH (C-GEL 04230) | 2.333 |
| TWEEN 60 | 1.200 |
| F-80DE MICROPEARL ® | 0.600 |
| VEGETABLE OIL | 1.667 |
| MINERAL OIL | 1.667 |
| WATER | 49.167 |
| FRAGRANCE | 0.033 |
| PIGMENT | 0.100 |
| TOTAL | 100.000 |

Table 3 provides an exemplary formulation for the instant starch-based modeling compound in weight percent of the total compound comprising a starch-based binder, a retrogradation inhibitor such as waxy maize starch, a difunctional block copolymer surfactant and glass microspheres.

TABLE 3

Formulation of the modeling compound 3

| INGREDIENT | Modeling Compound 3 Weight Percent |
|---|---|
| SODIUM CHLORIDE | 5.714 |
| CALCIUM CHLORIDE | 5.714 |
| ALUMINUM SULFATE | 1.256 |
| POTASSIUM SORBATE | 0.300 |
| SODIUM BENZOATE | 0.200 |
| STARCH-BASED BINDER: FLOUR | 28.258 |
| WAXY MAIZE STARCH (C-GEL 04230) | 2.198 |
| BLOCK COPOLYMER SURFACTANT | 1.130 |
| SCOTHCHLITE ™ GLASS BUBBLES K25 | 5.652 |
| VEGETABLE OIL | 1.570 |
| MINERAL OIL | 1.570 |
| WATER | 46.313 |
| FRAGRANCE | 0.031 |
| PIGMENT | 0.094 |
| TOTAL | 100.000 |

Table 4 provides an exemplary formulation for the instant starch-based modeling compound in weight percent of the total compound comprising a starch-based binder, a retrogradation inhibitor such as waxy maize starch, a difunctional block copolymer surfactant and pre-expanded microspheres having a diameter from 35 to 55 μm and true density ranging from of 0.025 g/cc to 0.25 g/cc.

TABLE 4

Formulation of the modeling compound 4

| INGREDIENT | Modeling Compound 4 Weight Percent |
|---|---|
| SODIUM CHLORIDE | 6.067 |
| CALCIUM CHLORIDE | 6.067 |
| ALUMINUM SULFATE | 0.600 |
| POTASSIUM SORBATE | 0.300 |
| SODIUM BENZOATE | 0.200 |
| STARCH-BASED BINDER: FLOUR | 30.000 |
| WAXY MAIZE STARCH (C-GEL 04230) | 2.333 |

TABLE 4-continued

Formulation of the modeling compound 4

| INGREDIENT | Modeling Compound 4 Weight Percent |
|---|---|
| BLOCK COPOLYMER SURFACTANT | 1.200 |
| EXPANCEL ® 920DET40d25 | 0.600 |
| VEGETABLE OIL | 1.667 |
| MINERAL OIL | 1.667 |
| WATER | 49.167 |
| FRAGRANCE | 0.033 |
| PIGMENT | 0.100 |
| TOTAL | 100.000 |

Table 5 provides an exemplary formulation for the instant starch-based modeling compound in weight percent of the total compound comprising a starch-based binder, a retrogradation inhibitor such as waxy maize starch, a difunctional block copolymer surfactant, pre-expanded microspheres and a humectant.

TABLE 5

Formulation of the modeling compound 5

| INGREDIENT | Modeling Compound 5 Weight Percent |
|---|---|
| SODIUM CHLORIDE | 6.067 |
| CALCIUM CHLORIDE | 6.067 |
| ALUMINUM SULFATE | 0.600 |
| POTASSIUM SORBATE | 0.300 |
| SODIUM BENZOATE | 0.200 |
| STARCH-BASED BINDER: FLOUR | 30.000 |
| WAXY MAIZE STARCH (C-GEL 04230) | 2.333 |
| BLOCK COPOLYMER SURFACTANT | 1.200 |
| F-80DE MICROPEARL ® | 0.600 |
| VEGETABLE OIL | 1.667 |
| GLYCERIN | 3.000 |
| MINERAL OIL | 1.667 |
| WATER | 46.167 |
| FRAGRANCE | 0.033 |
| PIGMENT | 0.100 |
| TOTAL | 100.000 |

Example 2

Rheological Properties of the Modeling Compound

In this example, the rheological and physical properties of a modeling compound according to first aspect of the disclosure comprising microspheres F-80DE MICROPEARL® (Sample A) and a modeling compound that do not contain microspheres F-80DE MICROPEARL® (Sample B) were compared.

TABLE 6

Formulation of the modeling compounds Sample A and Sample B

| INGREDIENT | Sample A Weight Percent | Sample B Weight Percent |
|---|---|---|
| SODIUM CHLORIDE | 6.073 | 6.085 |
| CALCIUM CHLORIDE | 6.073 | 6.085 |
| ALUM | 0.601 | 0.401 |
| POTASSIUM SORBATE | 0.300 | 0.000 |
| SODIUM BENZOATE | 0.200 | 0.201 |
| FLOUR | 30.030 | 34.509 |

TABLE 6-continued

Formulation of the modeling compounds Sample A and Sample B

| INGREDIENT | Sample A Weight Percent | Sample B Weight Percent |
|---|---|---|
| C-GEL 04230, WAXY MAIZE STARCH | 2.336 | 6.061 |
| PEGOSPERSE ® 1500MS | 0.000 | 0.495 |
| BLOCK COPOLYMER SURFACTANT | 1.201 | 0.000 |
| F-80DE MICROPEARL ® | 0.601 | 0.000 |
| VEGETABLE OIL | 1.668 | 0.000 |
| MINERAL OIL | 1.668 | 2.840 |
| WATER | 49.216 | 43.290 |
| FRAGRANCE | 0.033 | 0.033 |
| TOTAL | 100.000 | 100.000 |

Various properties of the modeling compounds were evaluated by means and methods described herein.

Viscosity

In some embodiments, a Rheometer was used to measure viscosity of both the instant modeling compound (Sample A) and a modeling compound that do not contain microspheres (Sample B). The Rheometer is a rotational speed and stress controlled Rheometer. Measuring material filled the space between the bottom stationary plate and the upper rotating cone and flow behaviour was measured. Viscosity measurements were recorded in Pas*sec at changing Shear Rates (1/sec) at controlled Shear Stress. The test conformed to DIN 53018 and the measurements were done at 22° C. The results were plotted as viscosity curve in which flow characteristics were recorded over a range of shear rate (FIG. 1). As shown in FIG. 1, the viscosity as measured in Pascal second [Pas*s, PA–S] of Sample B is higher than viscosity of Sample A at changing sheer rates D measured in $sec^{-1}$ [1/s].

The effect of the concentration of surfactant in the modeling compound was studied. Modeling compounds having 0, 1.2, 2.4 and 3.5 percent weight of difunctional block copolymer surfactant and having the same concentration of starch-based binder, retrogradation inhibitor and microspheres were prepared. Viscosity of each sample was measured as described above. The results were plotted in FIG. 2 as viscosity curve in which flow characteristics were recorded over a range of shear rate. As shown in FIG. 2, the modeling compound comprising 1.2% difunctional block copolymer surfactant had a viscosity of about 370 Pas*s as compared to 853 Pas*s for the same compound which did not include the surfactant.

Texture Analysis

The texture of the instant modeling compound (Sample A) and of Sample B was measured using a texture Analyzer. Texture Analyzer can be operated in either compression or tension modes. The compression mode was used to test the hardness or viscoelastic properties of Sample A and Sample B. In compression mode, the probe was moved down slowly at pretest speed until a threshold value (the trigger) is reached (5 g). The probe then was moved a set distance (10 mm) at a set speed (0.5 mm/sec) into the sample material that was placed and fixed on the base table. The deformation force was continuously monitored as a function of both time and distance until the probe again returned to its starting position. The Max Force was recorded at the 10 mm distance. The Max Force of Sample B was found to be about 417.65 g, whereas the Max Force of Sample A was found to be about 289.3 g. Based on the texture analysis the instant modeling compound was found to be 1.44 times softer than Sample B.

Extrusion

The extrusion rate and extrusion time was measured by pushing the modeling compounds through a nozzle and the amount of time and extrusion rate were measured for both Sample A and Sample B. Based on the extrusion data, Sample A is 4.6 times easier to extrude than Sample B.

Effect of Drying on the Appearance of the Modeling Compounds

Figure 3:
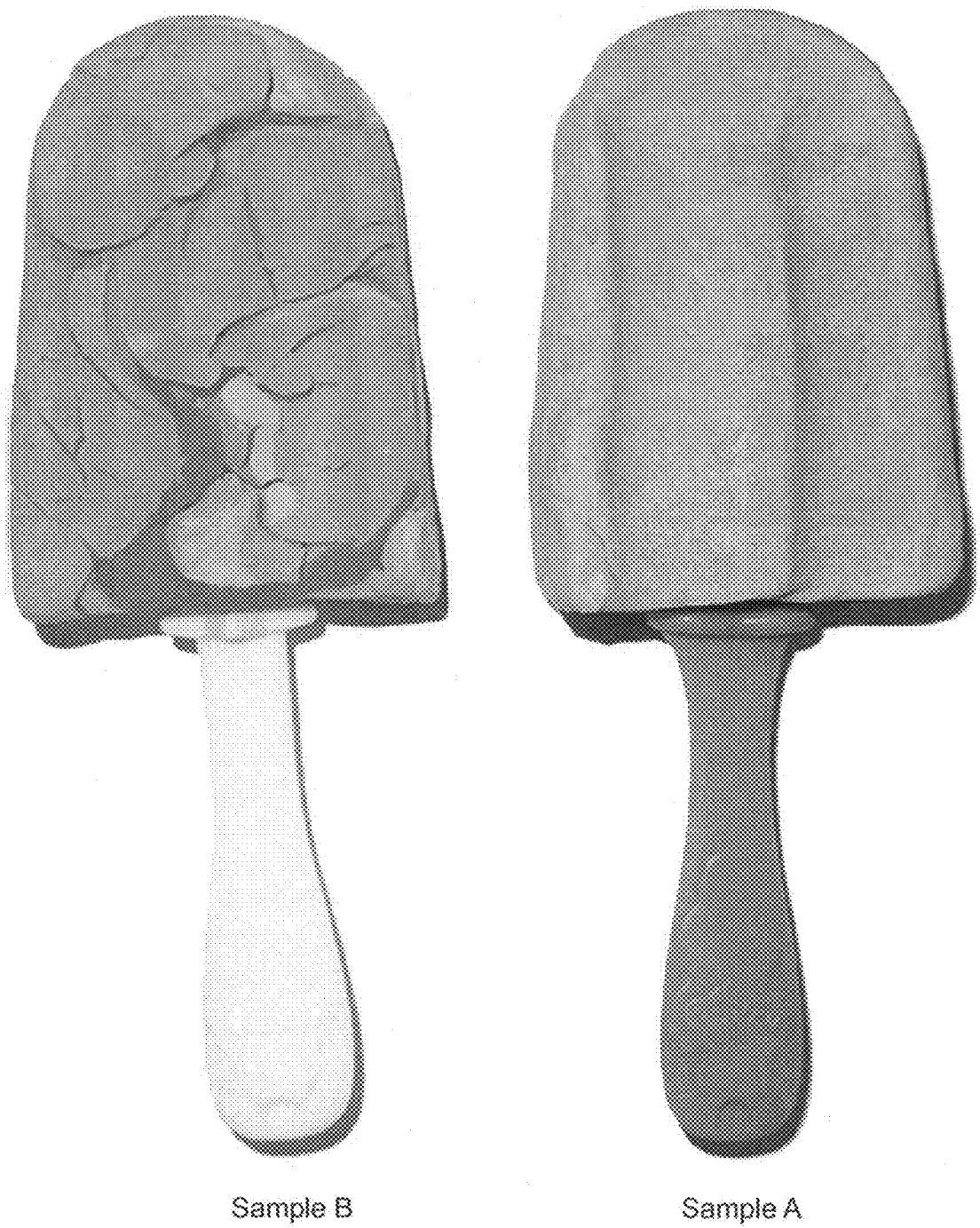
FIG. 3 shows molded objects in accordance with some embodiments.

FIG. 3 shows a picture of two molded shapes having a dimension of 6×4×2 cm molded using Sample A and Sample B. The molded shapes were dried for 48 hours at room temperature. As shown in FIG. 3, the molded shape made with Sample B shows cracks that are not apparent in the molded form made with the modeling compound disclosed in the present disclosure.

Example 3

Exemplary Formulation of the Modeling Compounds

Table 7 below provides an exemplary formulation for the starch-based modeling compound according to second aspect of the disclosure in weight percent of the total compound.

TABLE 7

Formulation of the modeling compound 6 (Sample C)

| INGREDIENT | Modeling Compound 6 Weight Percent |
|---|---|
| SODIUM CHLORIDE | 5.94 |
| CALCIUM CHLORIDE | 5.94 |
| ALUMINUM SULFATE | 0.59 |
| POTASSIUM SORBATE | 0.32 |
| SODIUM BENZOATE | 0.21 |
| STARCH-BASED BINDER: WHEAT FLOUR | 21.44 |
| CROSS-LINKED STARCH (PolarTex ® 06746) | 2.9 |
| WAXY MAIZE STARCH (C-GEL 04230) | 0.97 |
| BLOCK COPOLYMER SURFACTANT | 1.27 |
| F-80DE MICROPEARL ® | 0.77 |
| HYDROGENATED VEGETABLE OIL | 1.65 |
| MINERAL OIL | 3.8 |
| VINYLPYRROLIDONE POLYMER | 2.48 |
| GLYCERIN 96% | 9.91 |
| WATER | 41.81 |
| TOTAL | 100.000 |

In some embodiment, fragrance and colorants can be added to the formulation to improve appearance and odor.

Example 4

Rheological Properties of the Modeling Compound Sample C

In this example, the rheological and physical properties of a modeling compound according to second aspect of the disclosure comprising a combination of glycerine and vinylpyrrolidone polymer (Sample C), a modeling compound that do not contain microspheres F-80DE MICROPEARL® and that do not contain glycerine nor vinylpyrrolidone polymer (Sample B) and a modeling compound comprising microspheres F-80DE MICROPEARL® (Sample A) but that do not contain glycerine nor vinylpyrrolidone polymer were compared.

TABLE 8

Formulation of the modeling compounds
Sample A, Sample B and Sample C

| INGREDIENT | Sample A Weight Percent | Sample B Weight Percent | Sample C Weight Percent |
|---|---|---|---|
| SODIUM CHLORIDE | 6.073 | 6.085 | 5.94 |
| CALCIUM CHLORIDE | 6.073 | 6.085 | 5.94 |
| ALUM | 0.601 | 0.401 | 0.59 |
| POTASSIUM SORBATE | 0.300 | 0.000 | 0.32 |
| SODIUM BENZOATE | 0.200 | 0.201 | 0.21 |
| FLOUR | 30.030 | 34.509 | 21.44 |
| C-GEL 04230, WAXY MAIZE STARCH | 2.336 | 6.061 | 0.97 |
| CROSS-LINKED STARCH (PolarTex 06747) | 0.000 | 0.000 | 2.9 |
| PEGOSPERSE ® 1500MS | 0.000 | 0.495 | 0.000 |
| DIFUNCTIONAL BLOCK COPOLYMER SURFACTANT | 1.201 | 0.000 | 1.27 |
| F-80DE MICROPEARL ® | 0.601 | 0.000 | 0.77 |
| VEGETABLE OIL | 1.668 | 0.000 | 1.65 |
| MINERAL OIL | 1.668 | 2.840 | 3.8 |
| GLYCERIN 96% | 0.000 | 0.000 | 9.91 |
| VINYLPYRROLIDONE POLYMER | 0.000 | 0.000 | 2.48 |
| WATER | 49.216 | 43.290 | 41.81 |
| FRAGRANCE | 0.033 | 0.033 | |
| TOTAL | 100.000 | 100.000 | 100.000 |

Various properties of the modeling compounds were evaluated by means and methods described herein.

Viscosity

In some embodiments, a Rheometer was used to measure viscosity of a modeling compound according to a first aspect of the disclosure (Sample A), a modeling compound according to a second aspect of the disclosure (Sample C) and a modeling compound that do not contain microspheres (Sample B). The Rheometer is a rotational speed and stress controlled Rheometer. As used in this instance, only shear rate was controlled; the instrument measured resistance to motion (i.e., tau) and viscosity is dy/dx. Measuring material filled the space between the bottom stationary plate and the upper rotating cone and flow behaviour was measured. Viscosity measurements were recorded in Pas*sec (PA–S) at changing Shear Rates (1/sec) at measured Shear Stress. The test conformed to DIN 53018 and the measurements were done at 22° C. The dtau/dreciprocal seconds was plotted to produce the viscosity curve in which flow characteristics were recorded over a range of shear rates and as shear stress curve (FIG. 7).

Figure 7:
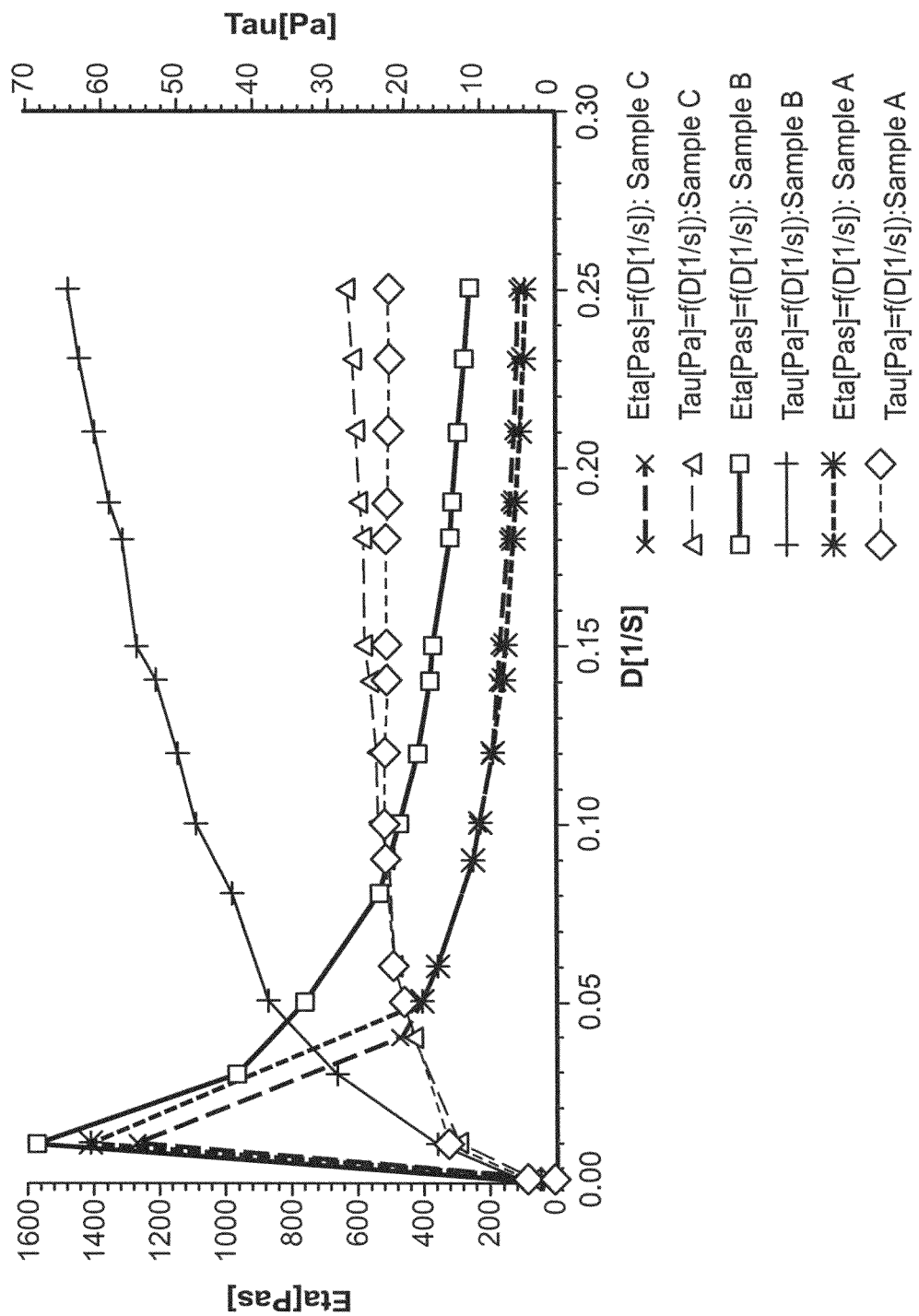
FIG. 7 shows the viscosity (Eta) in function of the shear rate (D) and the shear stress (Tau) in function of the shear rate (D).

FIG. 7 shows the viscosity (Eta, measured in Pascal second [PA–S]) of Sample A, Sample B and Sample C in function of the shear rate (D, measured in $sec^{-1}$ [1/s]) and the shear stress (Tau, measured in Pascal) in function of the shear rate (D). The viscosity curves of Sample A, Sample B and Sample C show that Sample C had a lower viscosity than Sample B at changing shear rates. FIG. 7 shows that the viscosity of Sample C decreases more rapidly than the viscosity of Sample B in function of the shear rate. As shown in FIG. 7, Sample A, Sample B and Sample C have pseudoplastic properties, i.e. have the capability of changing apparent viscosity with a change in shear rate. The viscosity of the different modeling compounds tested increases when the shear rate decreases. The shear stress curve shows that, at the shear rates above 0.05 $sec^{-1}$, more than twice as much work must be applied to make Sample B flow at the same rate as Sample A or Sample C. Without being bound by the theory, it is believed that the improved flowability of Sample A and Sample C is due to the ball bearing effect of the microspheres present in the compounds, the surfactant and the plasticizing oils.

Texture Analysis

The texture of a modeling compound according to a first aspect of the disclosure (Sample A), a modeling compound according to a second aspect of the disclosure (Sample C) and a modeling compound that do not contain microspheres (Sample B) was measured using a texture Analyzer. Texture measurements are indicative of the effort needed to manipulate or shape the modeling compound. Texture Analyzer can be operated in either compression or tension modes. The compression mode was used to test the hardness or viscoelastic properties of Sample A, Sample B and Sample C. In compression mode, the probe was moved down slowly at pretest speed until a threshold value (the trigger) is reached (5 g). The probe then was moved a set distance (10 mm) at a set speed (0.5 mm/sec) into the sample material that was placed and fixed on the base table. The deformation force was continuously monitored as a function of both time and distance until the probe again returned to its starting position. The Max Force was recorded at the 10 mm distance.

The Max Force of Sample B was found to be about 417.65 g, whereas the Max Force of Sample A was found to be about 289.3 g and the Max Force of Sample C was found to be about 200 g. Based on the texture analysis the modeling compound according to a second aspect of the disclosure (Sample C) was found to be 0.7 times softer than Sample A.

Extrusion

The extrusion rate and extrusion time was measured by pushing the modeling compounds through a nozzle and the amount of time and extrusion rate were measured for Sample A, Sample B and Sample C. The average extrusion rate of Sample C was about 1.6 gram/sec whereas average extrusion rate of Sample A was about 0.52 gram/sec, and the average extrusion rate for Sample B was about 0.12 gram/sec. Based on the extrusion data, Sample C is 3 times easier to extrude than Sample A and 13 times easier than conventional starch-based based compound (Sample B).

Effect of Drying on the Appearance of the Modeling Compounds

Figure 4A:
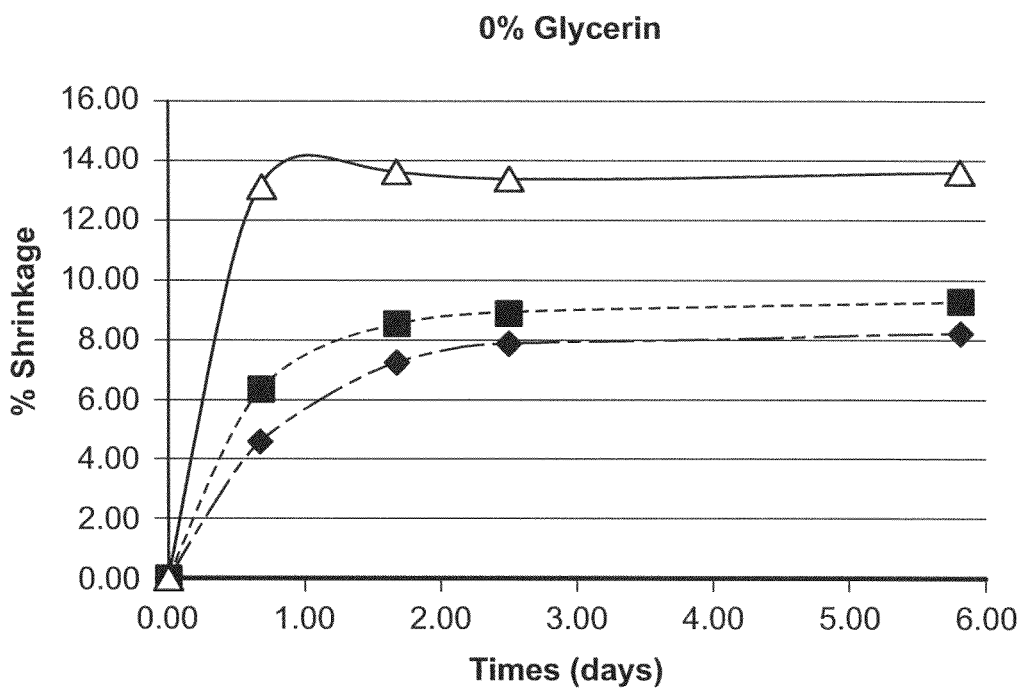
FIGS. 4A, 4B, 4C and 4D show the relationship between the amount of glycerine present in the modeling compound according to one embodiment and shrinkage of the modeling compound under ambient conditions (square), at 120° F. (triangle) or at 40% relative humidity (diamond).
Figure 4B:
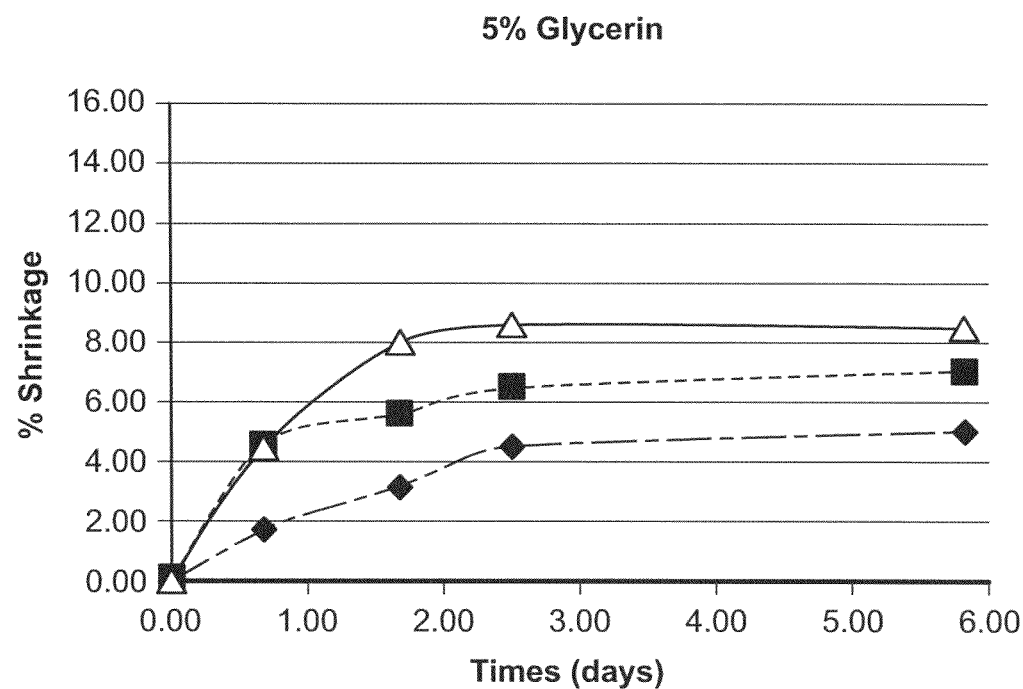
Figure 4C:
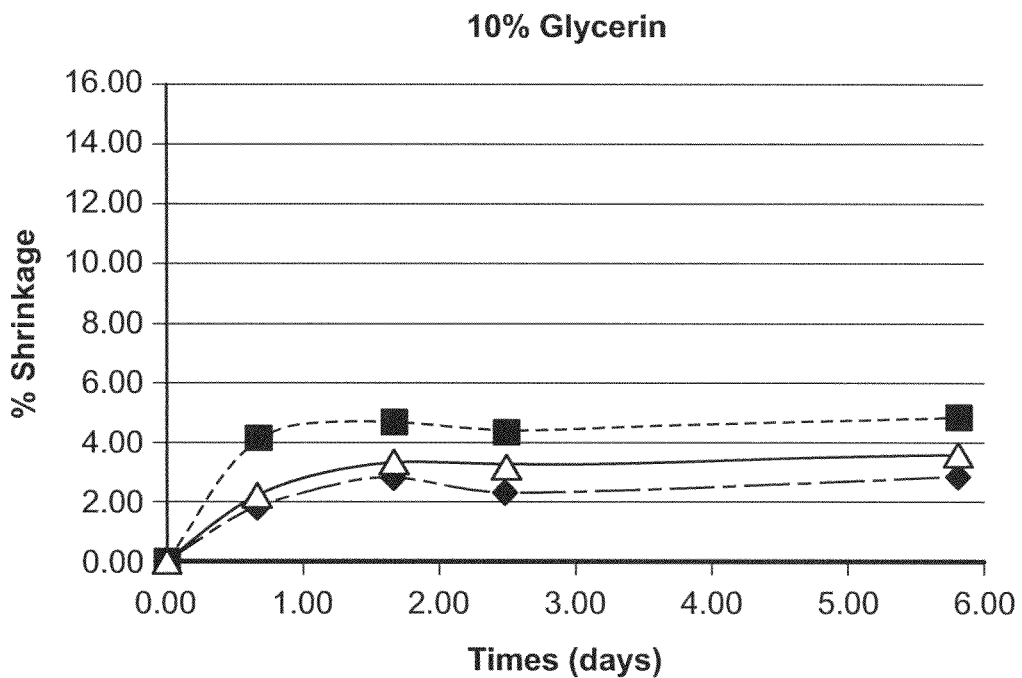
Figure 4D:
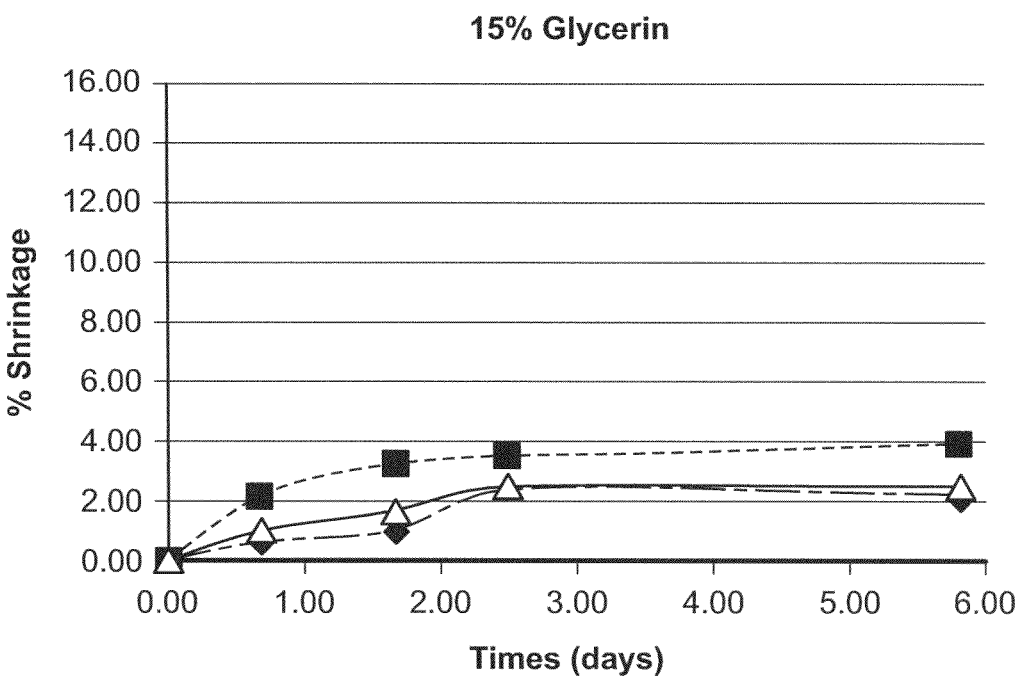

The relationship between the percent of glycerine and the percent of shrinkage over time was examined under different environmental conditions. FIG. 4A shows the shrinkage of the modeling compound in the absence of glycerine in function of time (days). FIG. 4B shows the shrinkage of the modeling compound in the presence of 5% glycerine in function of time (days). FIG. 4C shows the shrinkage of the modeling compound in the presence of 10% glycerine in function of time (days). FIG. 4D shows the shrinkage of the modeling compound in the presence of 15% glycerine in function of time (days). As shown in FIG. 4A and FIG. 4C, at ambient wintertime condition (square), the modeling compound without glycerin shrinks 10% whereas the modeling compound comprising 10% glycerin shrinks only 5%. When relative humidity is higher (diamond), the modeling compound without glycerine shrinks 8% whereas the modeling compound comprising 10% glycerin shrinks only 3%.

According to some embodiments, the modeling composition comprises a starch-based binder, water, a retrogradation inhibitor and microspheres. According to some embodiments, the modeling composition can further comprise a surfactant. According to some embodiments, the modeling composition can further comprise a lubricant, salt, and a preservative.

According to some embodiments, the modeling composition can comprise about 30% to about 60% by weight water, about 20% to about 40% by weight starch-based binder, about 2.0% to about 5.0% by weight lubricant, about 0.5% to about 4.0% by weight surfactant, about 5% to about 20% by weight salt, about 0.1% to about 1% by weight preservative, about 0.5% to about 5% by weight retrogradation inhibitor, 0% to about 1% by weight hardener, about 0.15% to about 1.2% by weight microspheres, 0% to about 10% by weight humectant, 0% to about 0.5% by weight fragrance, and 0% to about 5% by weight colorant.

According to some embodiments, the modeling composition can comprise about 30% to about 60% by weight water, about 20% to about 40% by weight starch-based binder, about 2.0% to about 8.0% by weight lubricant, about 0.5% to about 4.0% by weight surfactant, about 5% to about 20% by weight salt, about 0.1% to about 1% by weight preservative, about 0.5% to about 10% by weight retrogradation inhibitor, about 0.15% to about 1.2% by weight microspheres, about 0.5% to about 8% by weight vinylpyrrolidone polymers, 0% to about 15% polyols, 0% to about 1% by weight hardener, 0% to about 0.5% by weight fragrance, and 0% to about 5% by weight colorant.

According to some embodiments, the microspheres can be selected from the group consisting of one of pre-expanded microspheres, glass microspheres, or some combination thereof. The microspheres can be hollow microspheres, solid microspheres or some combination thereof. In some embodiments, the microspheres can have a size ranging from about 20 microns to about 130 microns.

According to some embodiments, the starch-based binder can comprise gelatinized starch. According to some embodiments, the starch-based binder can be selected from a group consisting of one of wheat flour, rye flour, rice flour, tapioca flour or some combination thereof.

According to some embodiments, the salt can be selected from the group consisting of one of sodium chloride, calcium chloride, potassium chloride or some combination thereof.

According to some embodiments, the lubricant can be selected from the group consisting of one of mineral oil, vegetable oil, vegetable fat, triglycerides or some combination thereof.

According to some embodiments, the retrogradation inhibitor can comprise amylopectin. For example, the retrogradation inhibitor can be selected from the group consisting of one of waxy corn starch, waxy rice starch, waxy potato starch or some combination thereof. According to some embodiments, the retrogradation inhibitor can be crosslinked starch, modified starch, modified crosslinked starch or some combination thereof. For example, the retrogradation inhibitor can be crosslinked waxy maize starch, modified waxy maize starch, modified crosslinked waxy maize starch or some combination thereof. In some embodiments, the modeling composition can comprise up to 8 percent weight of retrogradation inhibitor, such as crosslinked starch, modified starch, modified crosslinked starch.

According to some embodiments, the surfactant can be selected from the group consisting of one of polyethylene glycol esters of oleic acid, polyethylene glycol esters of stearic acid, polyethylene glycol esters of palmitic acid, polyethylene glycol esters of lauric acid, ethoxylated alcohols, block copolymer of ethylene oxide, block copolymer of propylene oxide, block copolymer of ethylene and propylene oxides or some combination thereof.

According to some embodiments, the preservative is selected from the group consisting of one of calcium propionate, sodium benzoate, potassium sorbate, other food grade preservatives or some combination thereof.

According to some embodiments, the hardener can be selected from the group consisting of one of sodium aluminum sulfate, potassium aluminum sulfate, aluminum ammonium sulfate, aluminum sulfate, ammonium ferric sulfate or some combination thereof.

According to some embodiments, the acidulant can be selected from the group consisting of one of citric acid, alum, potassium dihydrogen sulphate or some combination thereof.

According to some embodiments, the method of preparing the starch-based modeling compound comprises providing a mixer, adding to the mixer and mixing about 30% to about 60% by weight water, about 20% to about 40% by weight starch-based binder, about 2.0% to about 5.0% by weight lubricant, about 0.5% to about 4.0% by weight surfactant, about 5% to about 20% by weight salt, about 0.1% to about 1% by weight preservative, about 0.5% to about 5% by weight retrogradation inhibitor, 0% to about 1% by weight hardener, about 0.15% to about 1.2% by weight microspheres, 0% to about 10% by weight humectant, 0% to about 0.5% by weight fragrance, and 0% to about 5% by weight colorant.

According to some embodiments, the ingredients can be mixed to form a first mixture prior to adding water to the first mixture, and the water can be heated prior to adding the water to the first mixture.

According to some embodiments, the method of preparing the starch-based modeling compound comprises providing a mixer, adding the following ingredients to the mixer and mixing: about 20% to about 40% by weight starch-based binder, about 5% to about 20% by weight salt, about 0.1% to about 1% by weight preservative, about 0.5% to about 8% by weight retrogradation inhibitor, 0% to about 1% by weight hardener, adding the following ingredients and mixing: about 2.0% to about 8.0% by weight lubricant, about 0.5% to about 4.0% by weight surfactant, adding the following ingredients and mixing: about 30% to about 60% by weight water, about 0.15% to about 1.2% by weight microspheres, adding 0% to about 15% polyols and mixing; and optionally adding % to about 0.5% by weight fragrance and 0% to about 5% by weight colorant and mixing to form the starch-based modeling compound.

The disclosure has been described with reference to particular preferred embodiments, but variations within the spirit and scope of the disclosure will occur to those skilled in the art. It is noted that the foregoing examples have been provided merely for the purpose of explanation and are in no way to be construed as limiting of the present disclosure. While the present disclosure has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present disclosure in its aspects. Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

All patents, patent applications, and published references cited herein are hereby incorporated by reference in their entirety. While the methods of the present disclosure have been described in connection with the specific embodiments thereof, it will be understood that it is capable of further modification. Furthermore, this application is intended to cover any variations, uses, or adaptations of the methods of the present disclosure, including such departures from the present disclosure as come within known or customary practice in the art to which the methods of the present disclosure pertain, and as fall within the scope of the appended claims.

What is claimed is:

1. A modeling composition consisting of:
   (a) about 30% to about 60% by weight water;
   (b) about 20% to about 40% by weight starch-based binder;
   (c) about 2.0% to about 8.0% by weight lubricant;
   (d) about 0.5% to about 4.0% by weight surfactant;
   (e) about 5% to about 20% by weight salt;
   (f) about 0.1% to about 1% by weight preservative;
   (g) about 0.5% to about 10% by weight retrogradation inhibitor;
   (h) about 0.15% to about 1.2% by weight microspheres;
   (i) about 0.5% to about 8% by weight vinylpyrrolidone polymers;
   (j) 0% to about 15% polyol;
   (k) 0% to about 1% by weight hardener;
   (l) 0% to about 0.5% by weight fragrance; and
   (m) 0% to about 5% by weight colorant.

2. The modeling composition of claim 1, wherein the polyols are selected from the group consisting of glycerine, sorbitol, propylene glycol and some combination thereof.

3. The modeling composition of claim 1, wherein the microspheres are selected from the group consisting of pre-expanded microspheres, glass microspheres, and some combination thereof.

4. The modeling composition of claim 1, wherein the microspheres are hollow microspheres, solid microspheres or some combination thereof.

5. The modeling composition of claim 1, wherein the microspheres have a size ranging from about 20 microns to about 130 microns.

6. The modeling composition of claim 1, wherein the salt is selected from the group consisting of sodium chloride, calcium chloride, potassium chloride and some combination thereof.

7. The modeling composition of claim 1, wherein the lubricant is selected from the group consisting of mineral oil, vegetable oil, vegetable fat, triglycerides and some combination thereof.

8. The modeling composition of claim 1, wherein the retrogradation inhibitor is selected from the group consisting of crosslinked starch, modified starch, modified crosslinked starch, starch and some combinations thereof.

9. The modeling composition of claim 1, wherein the retrogradation inhibitor is selected from the group consisting of crosslinked waxy maize starch; modified waxy maize starch, modified crosslinked waxy maize starch, waxy corn starch, waxy rice starch, waxy potato starch and some combination thereof.

10. The modeling composition of claim 1, wherein the surfactant is selected from the group consisting of polyethylene glycol esters of oleic acid, polyethylene glycol esters of stearic acid, polyethylene glycol esters of palmitic acid, polyethylene glycol esters of lauric acid, ethoxylated alcohols, block copolymer of ethylene oxide, block copolymer of propylene oxide, block copolymer of ethylene and propylene oxides and some combination thereof.

11. The modeling composition of claim 1, wherein the starch-based binder is selected from the group consisting of wheat flour, rye flour, rice flour, tapioca flour and some combination thereof.

12. The modeling composition of claim 1, wherein preservative is selected from the group consisting of calcium propionate, sodium benzoate, potassium sorbate, and some combination thereof.

13. The modeling composition of claim 1, wherein the hardener is selected from the group consisting of sodium aluminum sulfate, potassium aluminum sulfate, aluminum ammonium sulfate, aluminum sulfate, ammonium ferric sulfate and some combination thereof.

14. The modeling composition of claim 1, wherein the vinylpyrrolidone polymers are selected from the group of vinylpyrrolidone homopolymers, vinylpyrrolidone copolymers and some combination thereof.

15. The modeling composition of claim 1, wherein the polyol is glycerin 96 %.

16. The modeling composition of claim 8, wherein the retrogradation inhibitor comprises up to 8% by weight crosslinked waxy maize starch, modified waxy maize starch, modified crosslinked waxy maize starch or some combination thereof.

17. A method of preparing the modeling composition of claim 1 comprising:
   (a) providing a mixer;
   (b) adding ingredients (1)-(6) to the mixer and mixing:
      (1) about 20% to about 40% by weight starch-based binder;
      (2) about 5% to about 20% by weight salt;
      (3) about 0.1% to about 1% by weight preservative;
      (4) about 0.5% to about 8% by weight retrogradation inhibitor;
      (5) 0% to about 1% by weight hardener;
      (6) about 0.5% to about 8% by weight vinylpyrrolidone polymers;
   (c) adding ingredients (7)-(8) and mixing
      (7) about 2.0% to about 8.0% by weight lubricant;
      (8) about 0.5% to about 4.0% by weight surfactant;
   (d) adding ingredients (9)-(10) and mixing
      (9) about 30% to about 60% by weight water;
      (10) about 0.15% to about 1.2% by weight microspheres;
   (e) adding 0% to about 15% polyol and mixing;
   (f) optionally adding ingredients (11)-(12) and mixing;
      (11) 0% to about 0.5% by weight fragrance; and
      (12) 0% to about 5% by weight colorant.

* * * * *